Figure 1:
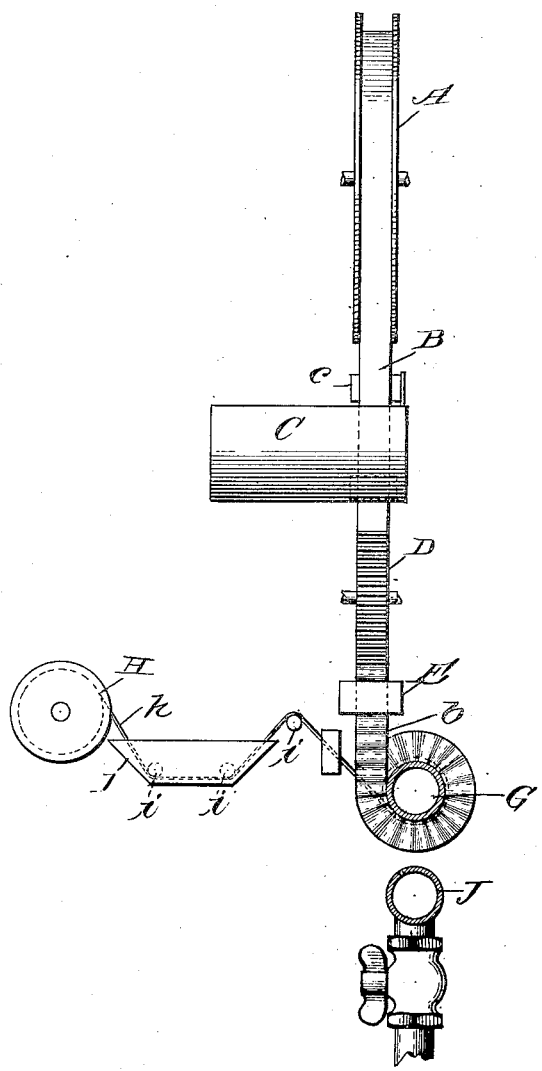

No. 817,938. PATENTED APR. 17, 1906.
F. H. STOLP & C. WRIGHT.
METHOD OF MAKING RADIATOR TUBES.
APPLICATION FILED JUNE 27, 1904.

Witnesses:
O. M. Hermich
J. L. Hanley

Inventors,
Frank H. Stolp and Christopher Wright
By L. M. Hopkins
Their Attorney.

UNITED STATES PATENT OFFICE.

FRANK H. STOLP AND CHRISTOPHER WRIGHT, OF CHICAGO, ILLINOIS, ASSIGNORS TO LONG MANUFACTURING COMPANY, OF CHICAGO, ILLINOIS, A CORPORATION.

METHOD OF MAKING RADIATOR-TUBES.

No. 817,938.     Specification of Letters Patent.     Patented April 17, 1906.

Application filed June 27, 1904. Serial No. 214,374.

*To all whom it may concern:*

Be it known that we, FRANK H. STOLP and CHRISTOPHER WRIGHT, citizens of the United States, residing at Chicago, in the county of Cook and State of Illinois, have invented a certain new and useful Method of Making Radiator-Tubes, of which the following is a specification.

The present invention relates to the method of making radiator-tubes having extended radiating-surfaces, and more particularly that class of radiator-tubes in which the extended radiating-surfaces are provided by a strip or ribbon of sheet metal, preferably copper, which is disposed spirally about the tube proper and has crimps or corrugations which gradually decrease in depth from the surface of the tube outward.

The improved method consists in forming in the strip of sheet metal which is to provide the extended radiating-surfaces a series of transverse crimps or corrugations, which extend from edge to edge of the strip and are of practically uniform depth throughout. This strip is then wound edgewise and in a spiral course around the tube proper, sufficient tension being applied to it during the winding process to make its inner edge or the edge which contacts with the tube conform thereto and hug it closely. Incidentally this stretches the corrugated strip, so that the corrugations are straightened out or elongated more or less. As the corrugated strip is being wound upon the tube a strip or strand of solder (preferably in the form of a round wire) is wound spirally around the tube between the convolutions of the corrugated strip. Heat is then applied to melt the solder, a suitable flux having been previously applied to cause the solder when melted to flow into the joint between the inner edge of the corrugated strip and the outer surface of the tube. The flux is preferably applied to the strip before it is corrugated and preferably the strand of solder also is fluxed before it is wound upon the tube. The heat is preferably applied as the winding proceeds and not until several convolutions have been wound. The advantage of this latter is that so long as these several convolutions of the strand of solder remain intact they will hug the tube with sufficient friction to draw the strand as the winding proceeds.

The present application has nothing to do with the machine by which the invention which forms its subject (the method) may be carried out; but for the purpose of illustrating the foregoing description this specification is accompanied by drawings which form a part hereof, and in which—

Figure 2:
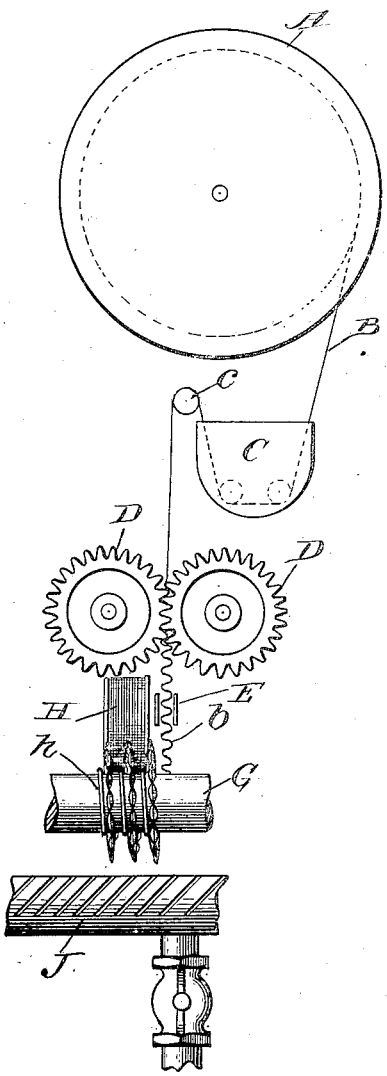

Figures 1 and 2 are elevations of so much of a machine for carrying out the invention as is necessary to an understanding thereof, the parts in the two figures being viewed from positions ninety degrees removed from each other, respectively.

A represents a spool or reel on which is wound the flat strip of sheet metal B, of which the extended radiating-surfaces are to be formed.

C is a receptacle containing flux through which the strip B runs, suitable rollers c being provided for guiding the strip into and out of the receptacle.

D represents a pair of rolls, having intermeshing flutes or corrugations, between which the strip B passes, whereby it is crimped or corrugated, as already described and as shown at b, said rolls being driven by any suitable means.

E represents guides between which the corrugated strip passes.

G is the tube onto which the corrugated strip is wound edgewise and in a spiral course.

H is a spool or reel on which a strip or strand of solder h is wound.

I is a receptacle containing flux through which the strand of solder runs, suitable rolls i being provided for guiding the strand into and out of the receptacle.

J is a gas-burner arranged beneath the tube G.

The winding of the corrugated strip and strand of solder upon the tube is accomplished by revolving the tube about its axis, and the spiral course is given the windings by giving the tube an endwise movement. For a better description of a complete machine reference is here made to our application of even date herewith, bearing Serial No. 214,375.

What we claim as new, and desire to secure by Letters Patent, is—

1. The method of making radiator-tubes having extended radiating-surfaces, which consists in forming transverse crimps or corrugations in a strip of sheet metal that is to provide the extended radiating-surface, winding the corrugated strip edgewise and in a spiral course around the tube proper, meanwhile applying tension thereto so as to more or less straighten out or elongate the corrugations to an extent gradually increasing from the inner edge of the strip outward and soldering the spirally-wound strip to the tube, substantially as described.

2. The method of making radiator-tubes having extended radiating-surfaces which consists in forming transverse crimps or corrugations in a strip of sheet metal that is to provide the extended radiating-surfaces, winding the corrugated strip edgewise and in a spiral course around the tube proper, meanwhile applying tension thereto so as to more or less straighten out or elongate the corrugations and so as to make the inner edge of the corrugated strip conform closely to the surface of the tube, and soldering the spirally-wound strip to the tube, as the strip is being wound upon the tube, substantially as described.

3. The method of making radiator-tubes having extended radiating-surfaces which consists in forming transverse crimps or corrugations in a strip of sheet metal that is to provide the extended radiating-surfaces, winding the corrugated strip edgewise and in a spiral course around the tube proper, winding a strand of solder around the tube spirally and between the convolutions of the corrugated strip, and applying heat to melt the solder, substantially as described.

4. The method of making radiator-tubes having extended radiating-surfaces which consists in forming transverse crimps or corrugations in a strip of sheet metal that is to provide the extended radiating-surfaces, winding the strip edgewise and in a spiral course around the tube proper, winding a strand of solder around the tube spirally and between the convolutions of the corrugated strip, applying flux to the strip and strand before winding and applying heat to melt the solder after winding, substantially as described.

5. The method of making radiator-tubes having extended radiating-surfaces which consists in forming transverse crimps or corrugations in a strip of sheet metal that is to provide the extended radiating-surfaces, winding the corrugated strip edgewise and in a spiral course around the tube proper; meanwhile, applying tension thereto so as to more or less straighten out or elongate the corrugations to an extent gradually increasing from the inner edge of the strip outward, winding a strand of solder around the tube spirally and between the convolutions of the corrugated strip, and melting the solder after it is wound, the joint between the strip and tube having been previously fluxed, substantially as described.

6. The method of soldering a spiral joint which consists in winding one part upon another to form the joint, winding a loose strand of solder along or adjacent to the joint as it is formed and melting the solder during the process of winding to cause it to flow into the joint, substantially as described.

7. The method of soldering which consists in winding one part upon another so that one contacts with the other to form a joint, applying to the joint during the process of winding a separate body of unfused solder, and fusing the solder after it is applied and during the process of winding, substantially as described.

8. The method of making radiator-tubes having extended radiating-surfaces which consists in disposing the extended radiating-surface spirally upon the tube, winding a strand of solder spirally upon the tube between the convolutions of the extended radiating-surfaces, and applying heat to fuse the solder, substantially as described.

FRANK H. STOLP.
CHRISTOPHER WRIGHT.

Witnesses:
BENJAMIN A. WOLFE,
L. M. HOPKINS.